United States Patent [19]
Laflamme

[11] Patent Number: 5,921,719
[45] Date of Patent: Jul. 13, 1999

[54] INSERT HOLDER WITH TOP CLAMP

[76] Inventor: Robert P. Laflamme, R.R. 3, Box 90C, Laconia, N.H. 03246

[21] Appl. No.: 08/912,627

[22] Filed: Aug. 18, 1997

[51] Int. Cl.$^6$ ........................................................ B23C 5/20
[52] U.S. Cl. ................................ 407/40; 407/49; 407/51; 407/53
[58] Field of Search ................................ 407/40, 30, 33, 407/34, 35, 41, 43, 47, 49, 50, 51, 53, 56

[56] References Cited

U.S. PATENT DOCUMENTS

| | | | |
|---|---|---|---|
| 5,033,916 | 7/1991 | Dunklau ................................ | 407/40 X |
| 5,271,442 | 12/1993 | Carpenter et al. ...................... | 407/40 X |
| 5,439,039 | 8/1995 | Bradstreet, Jr. et al. .............. | 407/40 X |
| 5,649,570 | 7/1997 | Kokko et al. ........................... | 407/49 X |

FOREIGN PATENT DOCUMENTS

| | | | |
|---|---|---|---|
| 123887 | 11/1984 | European Pat. Off. .................. | 407/34 |
| 197808 | 2/1978 | United Kingdom ...................... | 407/50 |

*Primary Examiner*—Andrea L. Pitts
*Assistant Examiner*—Henry W. H. Tsai
*Attorney, Agent, or Firm*—Michael J. Persson; William B. Ritchie

[57] ABSTRACT

A cutting tool insert holder apparatus comprising a milling cutter body with at least one flute and a clamp to secure the insert in the holder and dimensioned to be held by a metal cutting milling machine. The flute is disposed at one end of the body and comprises a pocket dimensioned to accept a rhomboid-shaped cutting insert having a top rake angle and a substantially flat surface in the clamping area, a threaded hole dimensioned to accommodate a clamp screw, a pivot cavity dimensioned to accommodate a pivot of a clamp, and dimensioned to allow tipping of the clamp. In the preferred embodiment, the clamp is sized to accommodate a rhomboid-shaped insert of a specific size and shape and comprises a contact surface dimensioned to contact the flat surface of the cutting insert, a clamp screw hole dimensioned to accommodate the clamp screw and having a centerline which is offset from the centerline of the threaded hole in the flute, a clamp screw dimensioned to pass through the clamp screw hole and be secured in the threaded hole in the flute, a pivot having a radial form dimensioned to mate with the pivot cavity of the flute to prevent axial motion of the clamp when said clamp screw is engaged and to allow the clamp to be tipped to permit indexing of the cutting insert when the clamp screw is released. In operation, the cutting insert is indexed by loosening the clamp screw one-half turn such that the clamp screw remains in the clamp screw hole, tipping the clamp, removing the cutting insert from the pocket, rotating the cutting insert 180°, placing the cutting insert back into the pocket, and securing the cutting insert into the pocket by tightening the clamp screw one-half turn.

10 Claims, 9 Drawing Sheets

INSERT HOLDER WITH TOP CLAMP

FIELD OF THE INVENTION

The present invention relates to the field of insert holders and, in particular, to the field of top clamping milling insert holders for use with indexable cutting inserts.

BACKGROUND OF THE INVENTION

A typical milling machine is an apparatus that features a rotating milling cutter having a number of indexable cutting inserts, where the rotating milling cutter is passed over the workpiece to remove material from the workpiece. Once a cutting edge of an indexable cutting insert is dulled, the insert is removed and rotated or "indexed" to expose a sharp cutting surface.

The use of milling cutters having replaceable cutting tool inserts began as long ago as 1917, when Fred P. Lovejoy invented the use of replaceable blades in order to obtain the economic advantages of having to replace only the dull portion of the tool, not the entire tool itself. Since that time, a myriad of cutting tool inserts having different shapes and sizes have been developed. However, few improvements have been made in the way cutting tool inserts are indexed and secured in milling cutters.

Over the years, several basic approaches to indexing and securing cutting tool inserts have been developed. One method, and current industry standard, involves securing a cutting tool insert to the milling cutter with a screw that passes through the insert and is tightened into a threaded hole in the cutter. This method has some mechanical advantages as the size tolerances between the screw and screw hole in the insert may be small enough to provide a relatively stable mounting system. However, the industry standard systems are not without disadvantages. In order to index an insert using the industry standard insert and cutter, the screw holding the insert in place must be completely removed and subsequently replaced after the insert has been indexed. The complete removal of a screw presents challenges as a typical operator is forced to grasp the cutter with one hand while simultaneously removing the screw and controlling the insert with the other. Should the operator drop the screw, it is likely to become intermingled with chips and other debris and be difficult to find. Similarly, if the operator drops an insert, there is a chance that a sharpened surface will be chipped or dulled resulting in the insert being unusable. In addition to the practical challenges of removing and installing industry standard inserts, the presence of a hole in the middle of the insert reduces the strength of the insert and leaves it susceptible to failure in situations where too much material is cut or where the milling machine is fed too quickly.

A number of top-clamping insert holders have been developed to overcome the indexing and strength problems associated with industry standard thru-hole cutting inserts. One top-clamping method uses a screw mounted adjacent to the insert and a rotatable finger clamp which contacts the top of the insert and clamps it into place. Another method uses a wedge to clamp the cutting tool insert into the milling cutter, though this method is limited as the size of the wedges required limits its use to large milling cutters. These methods eliminate the need for a hole through the insert, increasing insert strength and allowing inserts to be indexed quickly. However, they are not without their limitations. Both the "screw-mount" and "wedge-lock" top-clamping systems hold the insert in only one direction and, under operating conditions, inserts clamped in this fashion have a tendency to move unacceptably in both the radial and axial directions. In addition, the wedge-lock system may only be used with cutting tool inserts having flat top surfaces and thus is not adapted for use with rhomboid shaped cutting inserts. Therefore, a combined solution has been developed which provides a top clamp, similar to the screw-mount top clamp described above, and a cam pin which is inserted through a hole in an industry standard insert to provide axial stability. This solution allows inserts to be indexed relatively quickly, but suffers from the strength problems associated with all thru-hole style inserts.

A milling cutter which can top clamp a rhomboid-shaped insert in a fixed and stable position during operation without the use of a thru-hole lock screw, and which allows quick and easy indexing is not known in the art.

SUMMARY OF THE INVENTION

The invention is directed to an insert holder apparatus for holding a cutting insert and, in particular, to a milling cutter used to machine metal and dimensioned to securely hold a top-ground rhomboid-shaped insert as manufactured by R & J Tool, Inc., of Laconia, N.H.

The insert holder apparatus of the present invention comprises a milling cutter body with at least one flute and a clamp to secure the insert in the holder and dimensioned to be held by a metal cutting milling machine. The flute is disposed at one end of the body and comprises a pocket dimensioned to accept a rhomboid-shaped cutting insert having a top rake angle and a substantially flat surface in the clamping area, a threaded hole dimensioned to accommodate a clamp screw, a pivot cavity dimensioned to accommodate a pivot of a clamp, and dimensioned to allow tipping of the clamp. The clamp is sized to accommodate a rhomboid-shaped insert of a specific size and shape and comprises a contact surface dimensioned to contact the flat surface of the cutting insert, a clamp screw hole dimensioned to accommodate the clamp screw and having a centerline which is offset from the centerline of the threaded hole in said flute, a clamp screw dimensioned to pass through the clamp screw hole and be secured in the threaded hole in the flute, a pivot having a radial form dimensioned to mate with the pivot cavity of the flute to prevent axial motion of said clamp when said clamp screw is engaged and to allow the clamp to be tipped to permit indexing of the cutting insert when said clamp screw is released. In operation, the cutting insert is indexed by loosening the clamp screw one-half turn such that the clamp screw remains in the clamp screw hole, tipping the clamp, removing the cutting insert from the pocket, rotating the cutting insert 180°, placing the cutting insert back into the pocket, and securing the cutting insert into the pocket by tightening the clamp screw one-half turn.

The apparatus of the present invention is superior to the industry standard lock screw system for rhomboid-shaped inserts as the clamp has more clamping area than the conventional system, resulting in increased top support of the insert. Angles on the clamp provide for proper chip formation and ejection. The clamp is secured against the flute wall transferring some of the cutting force to unengaged parts of the cutter resulting in decreased stresses on the insert. In addition, the top clamp system of the present invention allows inserts to be indexed five times faster than conventional thru-hole lock screw systems resulting in significant cost savings.

It is an aspect of the invention to provide a milling cutter that cuts metal using rhomboid-shaped top-ground cutting inserts.

It is a further aspect of the invention to provide a milling cutter having a clamp that locks to prevent the cutting insert from moving in a radial or axial direction.

It is a further aspect of the invention to provide a milling cutter that uses rhomboid-shaped inserts with no lock screw hole to provide increased clamping area and increased strength.

It is a further aspect of the invention to provide a milling cutter that allows cutting inserts to be quickly and easily indexed reducing down time and operating costs.

It is a further aspect of the invention to provide a milling cutter that allows cutting inserts to be indexed without removing a lock screw.

It is a further aspect of the invention to provide a milling cutter with an angled clamp allowing chips to be properly formed and ejected.

It is a still further aspect of the invention to provide a milling cutter that transfers a portion of the cutting force to the other areas of the cutter to reduce stresses on the cutter.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE DRAWINGS

Figure 1:
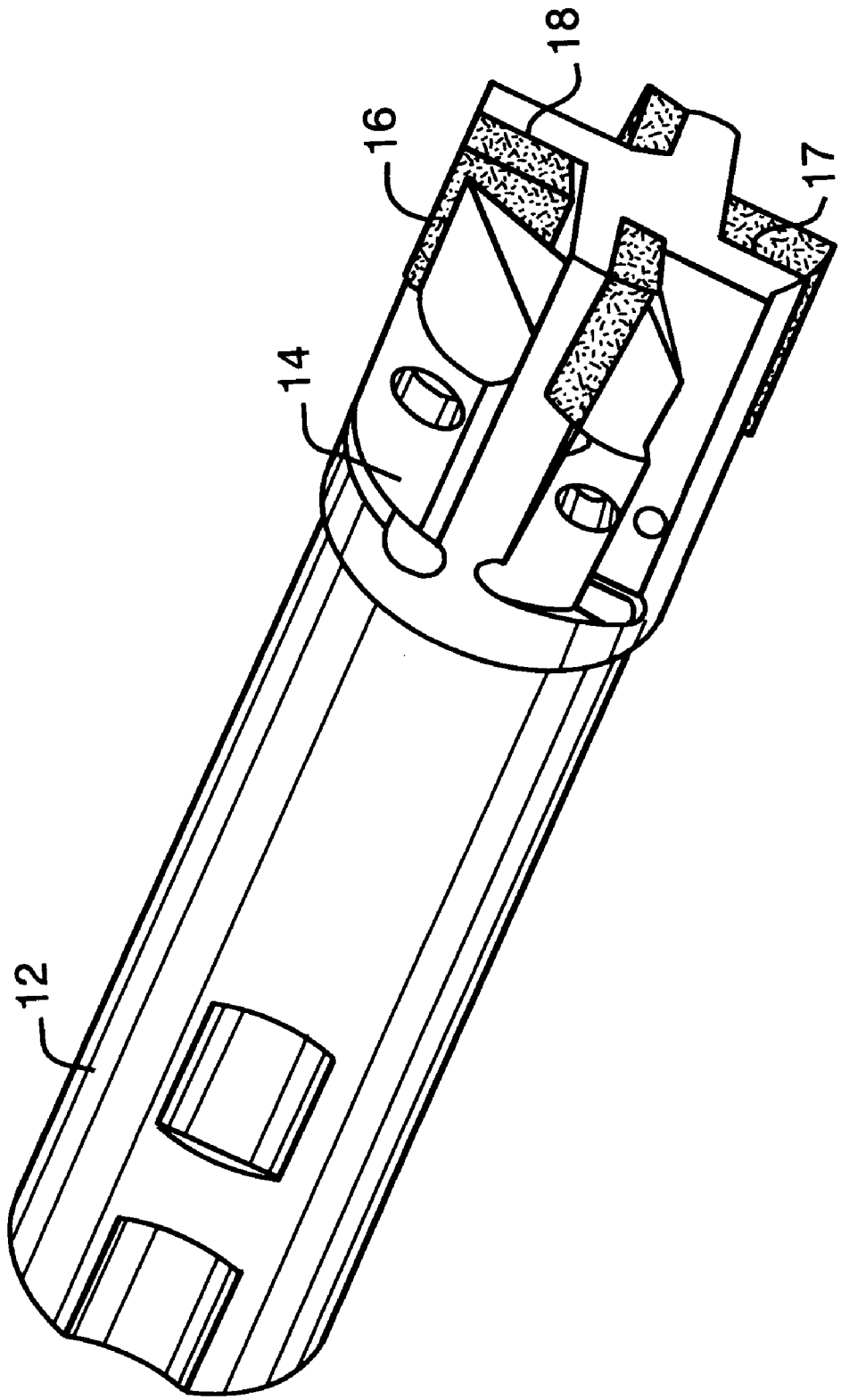
FIG. 1 is a perspective view of one embodiment of a metal machining milling cutter of the present invention having a top clamp and carbide milling insert.

FIG. 1 is a perspective view of a metal machining milling cutter 12 of the present invention having a plurality of top clamps 14 which lock a plurality of top-ground rhomboid-shaped milling inserts 16 into pockets 18 formed in the mounting surfaces 17 of milling cutter 12.

Figure 2:
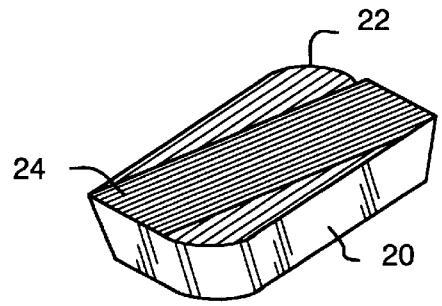
FIG. 2 is an isometric view of a top-ground rhomboid-shaped milling insert used with the milling cutter of the present invention.
Figure 3:
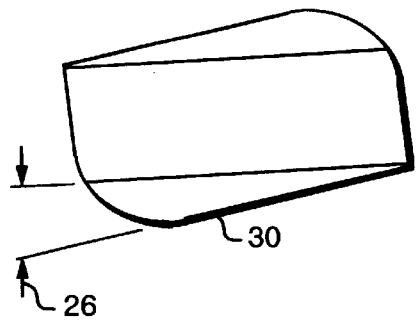
FIG. 3 is a top view of the insert of FIG. 2.
Figure 4:
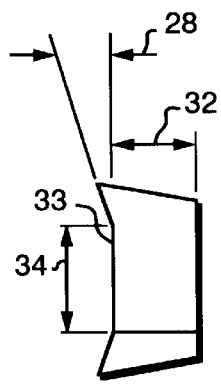
FIG. 4 is a side view of the insert of FIG. 2.

FIG. 2 is an isometric view of a top-ground rhomboid-shaped milling insert 20 such as those manufactured by R & J Tool, Inc. of Laconia, N.H. Insert 20 is manufactured from a blank using a compound shape 22 as is shown in FIGS. 2–4. Compound shape 22 is achieved by grinding three angles; rotational angle 26 and wing angles 28 from 0° to 45° on the top rake 25 of the insert 20. It should be noted that the insert 20 has no screw hole.

FIG. 3 is a top plan view of the insert 20 showing rotational angle 26. Rotational angle 26 is 10° for typical applications but may be varied depending upon the needs of the user. The length of cutting edge 30 is the perimeter of insert 20.

FIG. 4 is a side view of the insert 20 showing height 32 and center width 34 combined with rake angle 28 to produce the compound shape 22. Center width 34 is manufactured by grinding the top rake 24 of insert 20 to form a substantially flat surface 33 on which the top clamp of the milling cutter clamps the insert.

Figure 5:
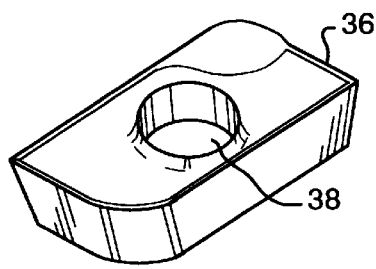
FIG. 5 is an isometric view of an industry standard milling insert having a mounting hole.

FIG. 5 is an isometric view of an industry standard rhomboid-shaped carbide milling insert 36 having a center hole 38 through which a lock screw is placed to secure the insert in a milling cutter pocket. When used in conjunction with an industry standard milling cutter, indexing of milling insert 36 requires the complete removal and replacement of the lock screw resulting in increased indexing time. In addition, the presence of a center hole 38 results in milling insert 36 having one-half the strength of the top-ground milling insert 20 of FIGS. 2–4 that has no hole. Despite this fact, industry standard rhomboid-shaped milling inserts, such as milling insert 36, may be dimensioned for use with the milling cutter of the present invention by grinding a flat top rake similar to the top rake of the insert of FIGS. 2–4. Though such a remanufactured insert does not offer the increased strength of the improved insert of FIGS. 2–4, a remanufactured insert secured by the milling cutter of the present invention may also be indexed five times faster than if it were secured using the prior art screw system resulting in significant cost savings.

Figure 6:
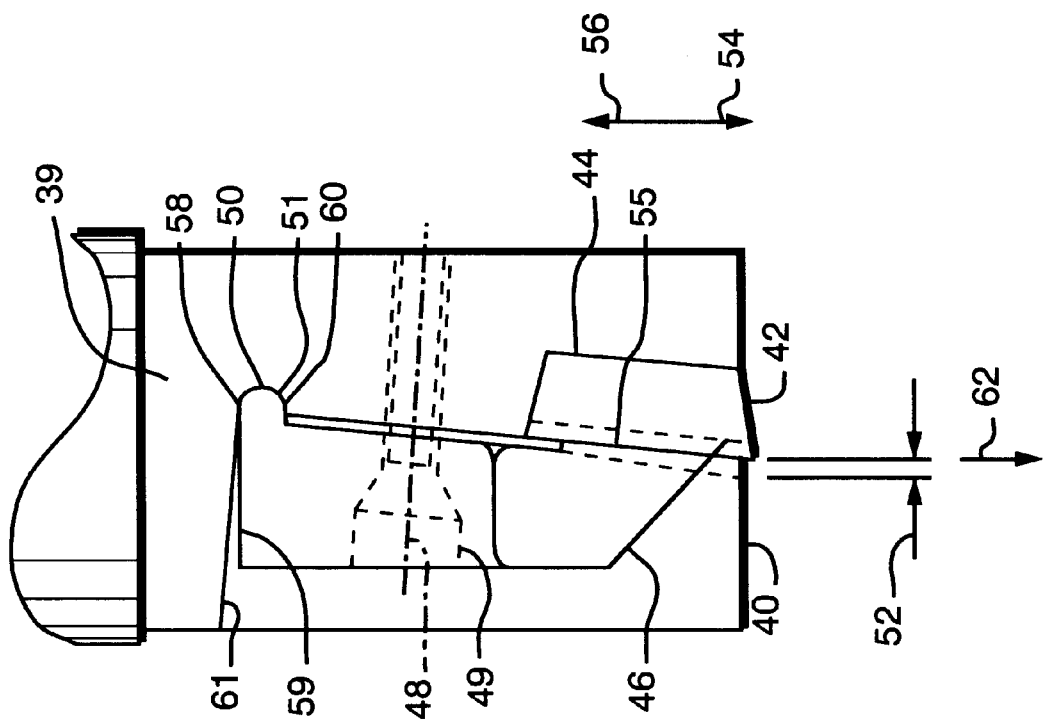
FIG. 6 is a side view of one embodiment of the milling cutter of the present invention showing the insert secured in the cutter body by the top clamp and clamp screw.
Figure 7:
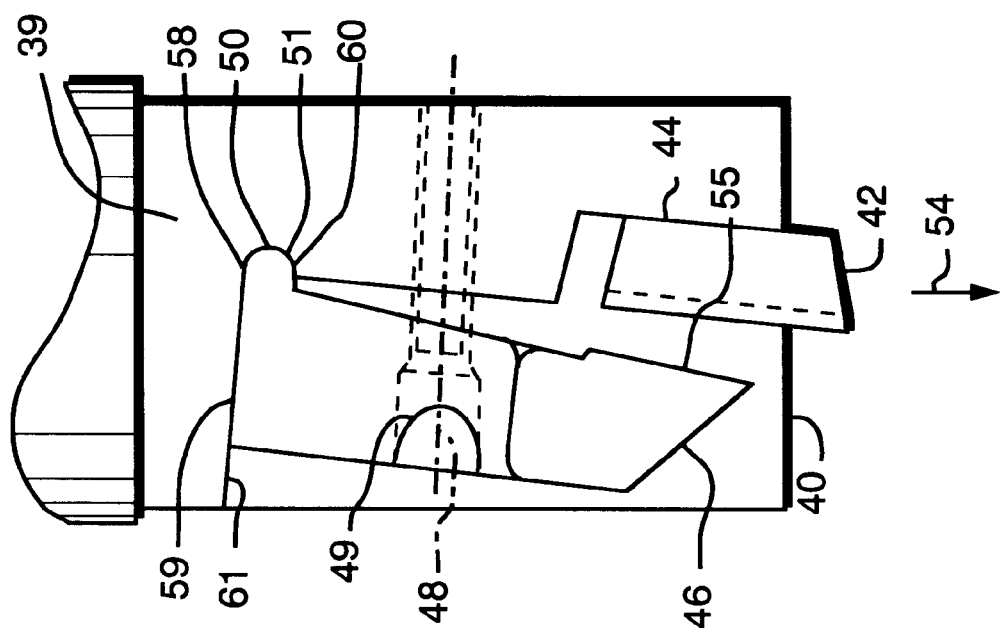
FIG. 7 is a side view of the embodiment of FIG. 6 showing the top clamp in the tipped position allowing the insert to be removed from the cutter body.

Referring now to FIGS. 6 and 7, side views of the milling cutter 40, showing the insert 42 both secured into pocket 44 of milling cutter 40 and in the process of being removed from pocket 44, are shown. Clamp 46 is comprised of a contact surface 55, clamp screw hole 49, pivot 50, and end surface 59. Contact surface 55 is formed in a predetermined shape and is dimensioned to hold a particular top-ground cutting insert 42 which, in the preferred embodiment, is a rhomboid shaped cutting insert. Clamp screw hole 49 is dimensioned to accommodate clamp screw 48 and, in the preferred embodiment of the invention, is formed with a chamfered counterbore. Pivot 50 has a radial form 58 to 60 which engages a pivot cavity 51 in flute 39 and locks the clamp 46 in milling cutter 40 to prevent axial motion in direction 62 when clamp screw 48 is engaged while allowing the clamp 46 to be tipped to permit insertion or removal of an insert 42 when clamp screw 48 is released. End surface 59 is located adjacent to pivot 50 and is dimensioned to provide clearance between the clamp 46 and the bottom surface 61 of the flute. In the preferred embodiment of the invention, end surface 59 is sloped at an angle of 5° from pivot 50. However, in other embodiments, clearance is provided by angling the bottom surface 61 of the flute or sloping the end surface 59 at a different angle than the preferred 5°.

Releasing the clamp screw 48 one-half turn allows the clamp 46 to be tipped forward about the pivot 50 through distance 52, effectively unlocking the insert 42 and allowing the insert 42 to be removed in direction 54. Insert 42 is indexed by rotating it 180° and placing it back into the pocket 44 in direction 56. Clamp screw 48 is tightened one-half turn locking insert 42 into pocket 44. Clamp 46 and lock screw 48 are not removed when indexing allowing the insert 42 to be indexed five times faster than the conventional insert 36 of FIG. 5.

Figure 8:
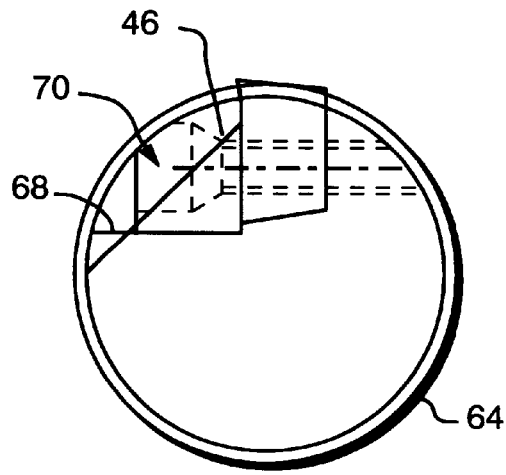
FIG. 8 is an end view of the milling cutter of FIG. 6 showing the engagement of the clamp to the flute wall.

FIG. 8 is an end view of the milling cutter 64 showing lock screw 70 through clamp 46 in contact with flute wall 68.

Figure 9:
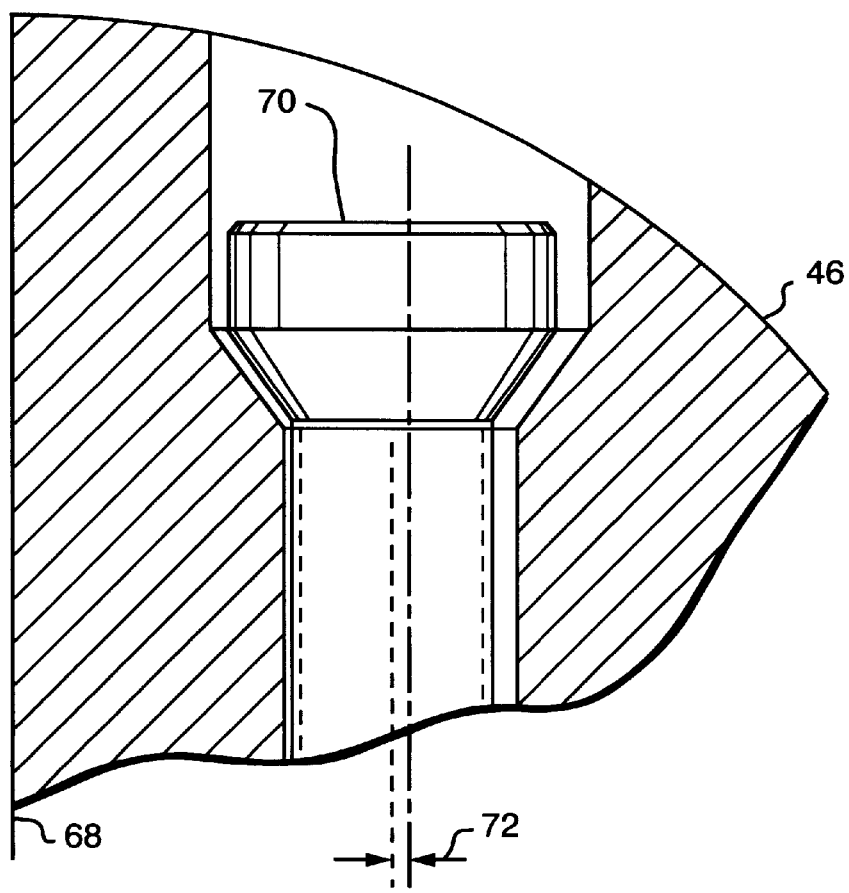
FIG. 9 is a section view of the milling cutter of FIG. 6 taken through the clamp and showing the centerline offset of the clamp screw.

FIG. 9 is a section view through clamp 46 of FIG. 8 and lock screw 70 showing centerline offset 72. Tightening lock screw 70 in the clamp 46 causes the clamp 46 to press firmly against the wall of flute 68 and prevents the clamp 46 from rotating about the lock screw 70. The centerline offset 72 allows lock screw 70 to exert forces on the clamp 46 in two directions, providing increased stability over prior art unidirectional top clamping systems.

Figure 10:
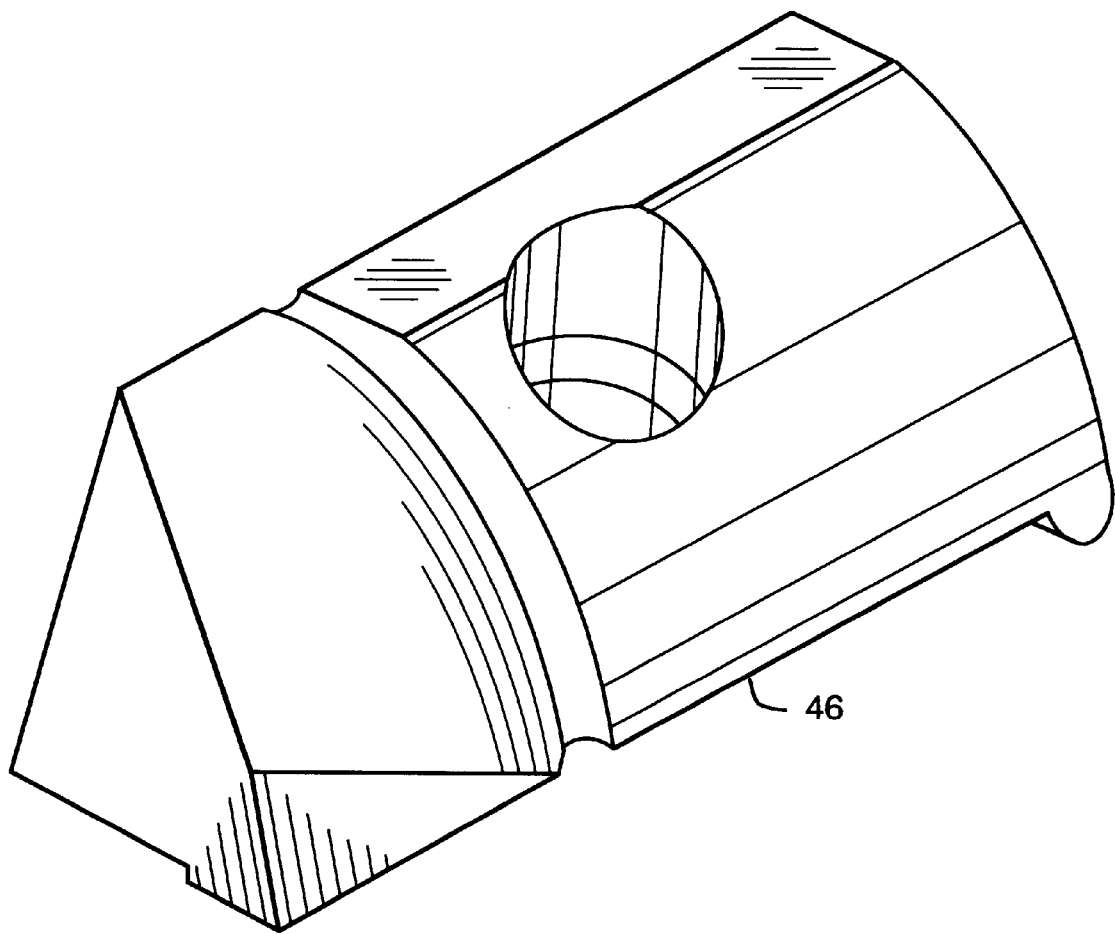
FIG. 10 is an isometric view showing the top clamp.

FIG. 10 is an isometric view of the top clamp 46.

Figure 11:
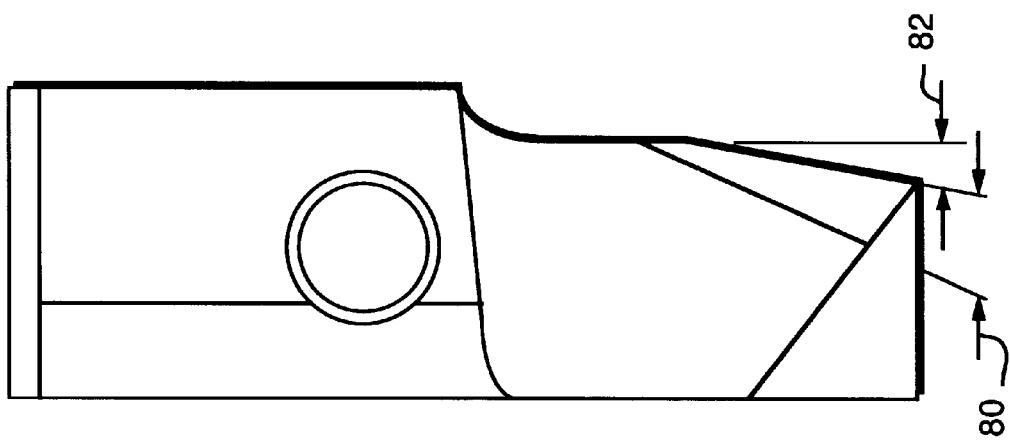
FIG. 11 is a top view of the clamp of the milling cutter of FIG. 10 showing the side chip clearance angle.

FIG. 11 is a top view of the top clamp of FIG. 10 showing the side chip clearance angle 80, required for proper chip ejection, rotated through 10° angle 82. In the preferred embodiment of the invention, adapted for use with tool steel, the side chip clearance angle 80 is 23°. However, other side chip clearance angles will also allow chips to be ejected and thus are contemplated by the present invention.

Figure 12:
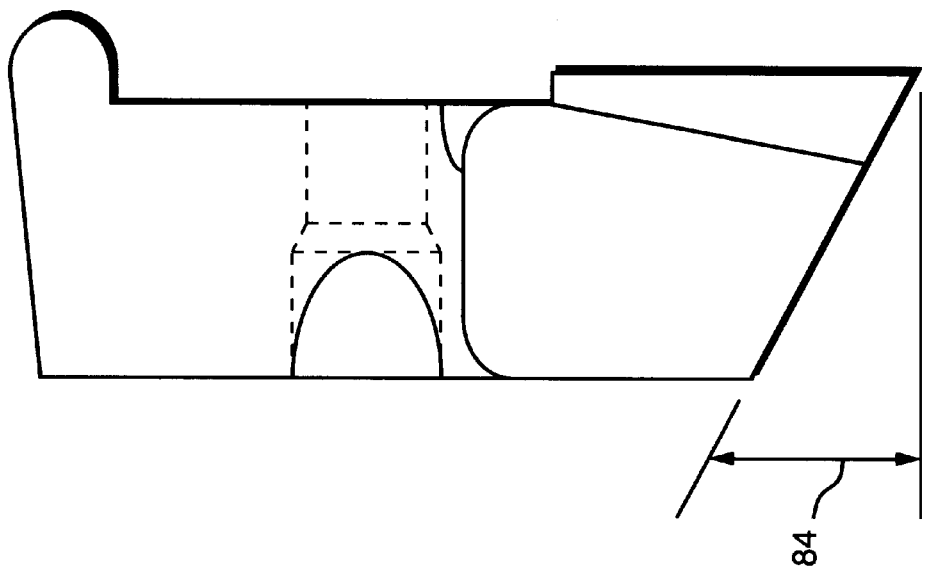
FIG. 12 is a side view of the clamp of the milling cutter of FIG. 10 showing the front chip clearance angle.

FIG. 12 is a side view of top clamp of FIG. 10 showing the front chip clearance angle 84 required for proper chip ejection. In the preferred embodiment of the invention, the front chip clearance angle 80 is 30°. However, other front chip clearance angles will also allow chips to be ejected and thus are contemplated by the present invention.

Figure 13:
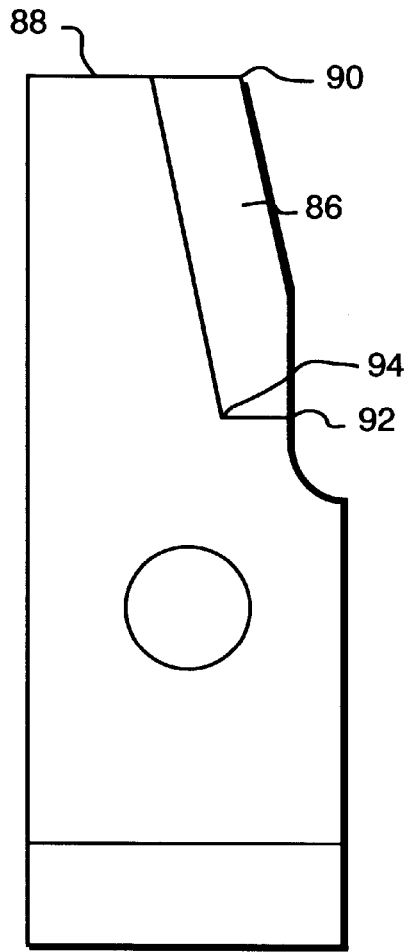
FIG. 13 is a bottom view of the clamp of the milling cutter of FIG. 10 showing clamping area.

FIG. 13 is a bottom view of the clamp of FIG. 10 showing the clamping area 86 that is defined by 88, 90, 92, and 94. Clamping area 86 is 70% larger than the clamping areas of clamp screws used to clamp standard insert 36 in FIG. 5 and results in increased stability and reduced stresses on the cutting inserts.

Figure 14:
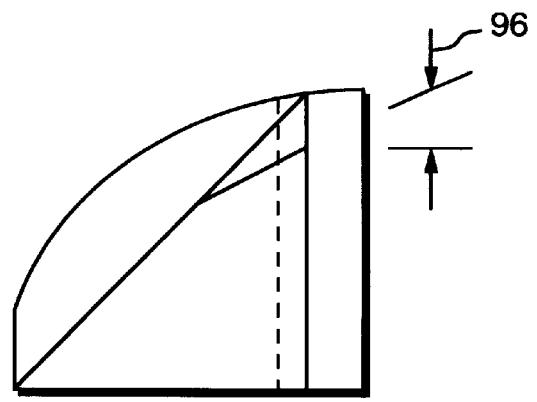
FIG. 14 is an end view of the clamp of the milling cutter of FIG. 10 showing the chip ejection angle.

FIG. 14 is an end view of the clamp of FIG. 10 showing the end chip clearance angle 96 required for chip ejection. In the preferred embodiment of the invention, the end chip clearance angle 96 is 23°. However, other end chip clearance angles will also allow chips to be ejected and thus are contemplated by the present invention.

Figure 15:
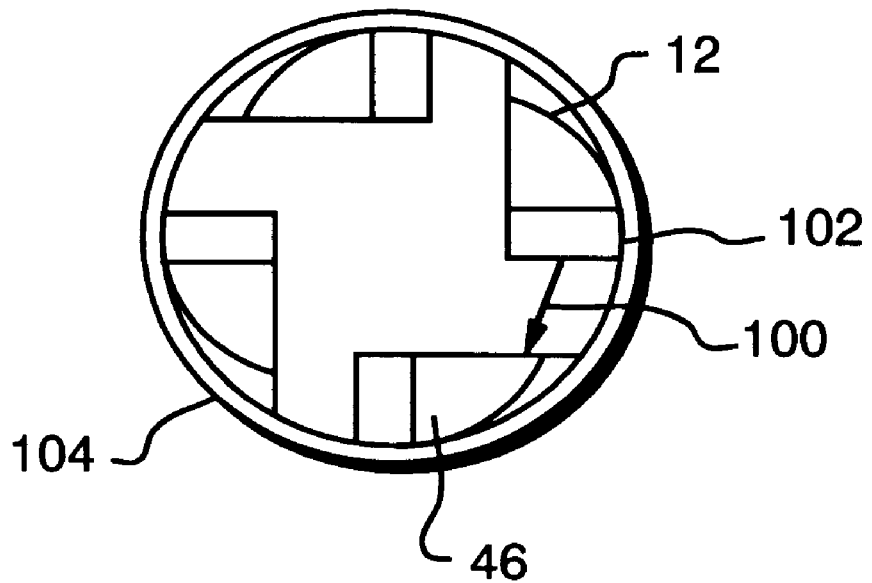
FIG. 15 is an end view of a four-flute milling cutter of the present invention showing rotational cutting forces.

FIG. 15 is an end view of a four-flute milling cutter 12 of the present invention showing rotational cutting forces. Rotational cutting force 100 is transferred through insert 102 to cutter body 104 and next to clamp 46, and is then transferred radially to the next area of the cutter body 104. This provides more radial strength than the single lock screw used to secure the insert as shown in FIG. 5.

Figure 16:
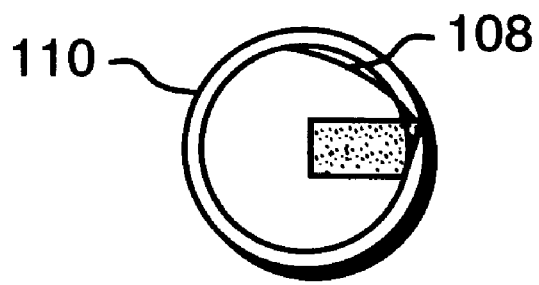
FIG. 16 is an end view of a single-flute milling cutter of the present invention.

FIG. 16 is an end view of a ¾ inch diameter single-flute 108 milling cutter 110 of the present invention.

Although the present invention has been described in considerable detail with reference to certain preferred versions thereof, other versions would be readily apparent to those of ordinary skill in the art. In particular, though the present invention has been described with reference to milling cutters, the present invention may be adapted for use with other cutting tools such as lathes, for example, that presently utilize inserts. In addition, although the preferred embodiment of the present invention is used to clamp rhomboid-shaped cutting inserts, the present invention may be used with any insert having a flat clamping surface and thus is also adapted for use with, for example, triangular, square or diamond shaped inserts. Therefore, the spirit and scope of the appended claims should not be limited to the description of the preferred versions contained herein.

What is claimed is:

1. An insert holder apparatus for holding a cutting insert comprising:

a body dimensioned to be held by a metal cutting machine;

at least one flute disposed at one end of said body, said flute comprising a pocket dimensioned to accept a cutting insert having a top rake with a substantially flat surface, a threaded hole dimensioned to accommodate a clamp screw, a pivot cavity dimensioned to accommodate a pivot of a clamp, and a bottom surface adjacent said pivot cavity;

a clamp comprising a contact surface dimensioned to contact the flat surface of the cutting insert, a clamp screw hole dimensioned to accommodate said clamp screw and having a centerline which is offset from a centerline of said threaded hole in said flute such that said clamp screw exerts forces on said clamp in two directions to prevent said clamp from rotating about said clamp screw, said clamp screw dimensioned to pass through said clamp screw hole and be secured in said threaded hole in said flute, a pivot having a radial form dimensioned to mate with said pivot cavity of said flute to prevent axial motion of said clamp when said clamp screw is engaged and to allow said clamp to be tipped to permit indexing of the cutting insert when said clamp screw is released, and an end surface dimensioned to provide clearance between an end of said clamp and said bottom surface of said flute;

wherein the cutting insert may be indexed by loosening said clamp screw one-half turn such that said clamp screw remains in said clamp screw hole, tipping said clamp until said contact surface is disengaged from the flat surface of the cutting insert, removing the cutting insert from said pocket, rotating the cutting insert 180°, placing the cutting insert back into said pocket, and securing the cutting insert into said pocket by tightening said clamp screw one-half turn.

2. The apparatus of claim 1 wherein said pocket is adapted to accept a rhomboid-shaped cutting insert.

3. The apparatus of claim 1 wherein said body is dimensioned to be held in a chuck of a milling machine.

4. The apparatus of claim 1 wherein said clamp further comprises a front chip clearance angle dimensioned to allow chips generated during cutting to be ejected.

5. The apparatus of claim 4 wherein said front chip clearance angle is between 25° and 35°.

6. The apparatus of claim 1 wherein said clamp further comprises a side chip clearance angle dimensioned to allow chips generated during cutting to be ejected.

7. The apparatus of claim 6 wherein said side chip clearance angle is between 20° and 30°.

8. The apparatus of claim 1 wherein said clamp further comprises an end chip clearance angle dimensioned to allow chips generated during cutting to be ejected.

9. The apparatus of claim 8 wherein said side chip clearance angle is between 20° and 30°.

10. The apparatus of claim 1 wherein said clamp is formed with an end surface sloped at an angle of 5° from said bottom surface of said flute.

* * * * *